United States Patent [19]

Carter et al.

[11] 4,319,827
[45] Mar. 16, 1982

[54] METHOD FOR ASSEMBLING PHOTOGRAPHIC SELF-PROCESSING APPARATUS

[75] Inventors: Stephen W. Carter, Lexington; Harvey S. Friedman, Sudbury; Irving S. Lippert, Lexington, all of Mass.

[73] Assignee: Polaroid Corporation, Cambridge, Mass.

[21] Appl. No.: 193,617

[22] Filed: Oct. 3, 1980

[51] Int. Cl.³ .............................................. G03D 5/02
[52] U.S. Cl. ..................................... 354/304; 354/86; 29/121.8; 29/407
[58] Field of Search .......................... 354/86, 87, 304; 29/121.1, 121.8, 407; 219/69 R, 69 M, 69 E

[56] References Cited

U.S. PATENT DOCUMENTS

| | | | |
|---|---|---|---|
| Re. 28,027 | 6/1974 | Bills et al. | 29/121.8 |
| 2,416,125 | 2/1947 | Simpson | 219/69 R |
| 3,398,253 | 8/1968 | Rye | 219/69 R |
| 3,410,980 | 11/1968 | Gugger et al. | 219/69 M |
| 3,562,702 | 2/1971 | Celovsky | 219/69 R |
| 3,600,546 | 8/1971 | Toshio | 219/69 M |
| 3,796,361 | 3/1974 | Rueckert | 29/121.8 |
| 3,878,353 | 4/1975 | Anderson | 219/69 E |
| 3,941,970 | 3/1976 | Grow | 219/69 M |
| 4,147,425 | 4/1979 | Friedman et al. | 354/304 |
| 4,200,382 | 4/1980 | Friedman | 354/304 |

*Primary Examiner*—L. T. Hix
*Assistant Examiner*—Alan Mathews
*Attorney, Agent, or Firm*—Francis J. Caufield

[57] ABSTRACT

A method for assembling photographic processing systems of the type for advancing integral, self-processable film units to the exterior of a camera while simultaneously spreading a fluid processing composition in a uniformly thin layer between selected layers of a film unit. A number of processing rollers which comprise the system are provided with a partially textured surface by using an electric discharge machining process having predetermined conditions, and then a number of test processing systems are assembled with these rollers and other pieceparts randomly selected from lots of all other pieceparts which comprise the system. Characteristic film units are processed through the test processing systems, and the fluid layer thickness in each of these film units is afterwards measured and compared with a predetermined standard. If the combination of test system parts provides acceptable fluid layer thickness control performance, the remaining pieceparts of each lot are used in combination with rollers having the predetermined texturing to manufacture additional systems. If the test system performance is not acceptable, the electric discharge machining process conditions are adjusted by a predetermined amount which is sufficient to effect minor changes in fluid layer thickness control that can result in acceptable performance. Rollers are then textured with the adjusted electric discharge machining process and systems are then assembled using the piecepart lots in combination with rollers having surfaces textured according to the adjusted electric discharge machining process.

12 Claims, 9 Drawing Figures

METHOD FOR ASSEMBLING PHOTOGRAPHIC SELF-PROCESSING APPARATUS

BACKGROUND OF THE INVENTION

1. Field of the Invention

This invention in general relates to photographic processing systems of the type used to spread a fluid processing composition in a thin layer between selected elements of self-processable type film units while simultaneously advancing such film units to the exterior of a camera and in particular to a method by which the assembly of such processing systems is facilitated through the use of an adjustable electric discharge machining technique used to partially texture rollers utilized in such systems.

2. Description of the Prior Art

Highly automated photographic cameras which utilizes integral self-processable type film units are well known in the photographic field, having been extensively described in the patent literature and in public use for several years now. Such cameras are designed to automatically produce finished, waste-free color prints with virtually no operator involvement other than to compose the picture, perhaps focus, and then actuate the camera by depressing its cycle "start" button.

Such cameras accomplish this through the use of specially-designed camera subsystems that are structured and logically organized to carry out a programmed series of sequential operations which produce the finished print.

Once actuated, the order of camera operations begins with exposure of a film unit or with automatic focusing which is thereafter followed by exposure of a film unit. Afterwards, the exposed film unit is advanced from its exposure position into engagement with a film processing subsystem or apparatus which initiates a diffusion transfer process for developing and forming a visible image in the film unit while transporting it to the exterior of the camera where it becomes accessible to the photographer.

The film units, as for example those described in considerable detail in U.S. Pat. Nos. 3,415,664; 3,594,165; and 3,761,268, normally contain all the photographic components necessary for the diffusion transfer process. Typically, the film units comprise, in general terms, a pair of superposed sheet elements, at least one being transparent, which serve to support layers of photochemical substances which may comprise photosensitive and image-receiving layers; and, as well, include a rupturable container of viscous processing fluid positioned adjacent a leading edge of the film unit and adapted to have its processing fluid released between the sheet elements to begin the diffusion transfer process. Release of the processing fluid is effected by the processing apparatus which first operates to rupture the container and thereafter causes the released mass of processing fluid to flow between the sheet elements, opposite the direction of travel of the film unit, so that the processing fluid is progressively deposited between the sheet elements as a thin, uniform layer generally coextensive with the exposed area of the film unit. Upon completion of the diffusion transfer process, the final image is viewable through the film unit sheet element which is transparent.

For optimum photographic image quality with film units utilizing this type of process, it is generally recognized that the thickness of the processing fluid layer must be substantially uniform and at least meet a minimum thickness requirement over the photoexposed area of the film unit. For example, the fluid layer thickness could nominally be a few thousandths of an inch with a tolerance of plus or minus a few ten-thousandths of an inch. Obviously fluid processing apparatus by which the thickness of the fluid layer over the photoexposed area of the film unit is controlled need to be manufactured to strict requirements in view of the tolerances imposed on the allowable variation in fluid layer thickness.

In general, the thickness of the processing fluid layer is a function of many variables which depend on the individual dimensions of the pieceparts which comprise the photographic processing apparatus and how the photographic processing apparatus interfaces with camera and film unit structure during the processing and transport stages. Examples of the many variables which can influence the thickness of the fluid layer include the magnitude of the compressive forces exerted on the film unit by processing rollers which form part of the fluid processing apparatus, the distance separating one processing roller from the other, the geometry, flexibility, and surface characteristics of the processing rollers, the viscosity of the processing fluid, the angle at which a film unit enters and exits the rollers, the physical characteristics of the photographic elements, and the speed at which the film unit is advanced between the rotating rollers.

Considering that such processing apparatus are structured of a number of pieceparts and that there are numerous variables which can effect the fluid layer thickness, it is understandable that it is a difficult task to properly manufacture such apparatus in view of the strict requirements imposed on their manufacture by the small tolerance variation allowed in the fluid layer thickness.

In order to meet the strict performance requirements imposed on such apparatus, one known practice in manufacturing fluid processing roller systems involves characterizing the geometry of the individual pieceparts which comprise the system and then assembling final systems on the basis of a piecepart match which will provide systems having optimum performance. Such a manufacturing process, however, requires carrying in inventory a number of spread rollers having different geometry which at present comprise about four groups which are used to accommodate variations in other pieceparts.

It is therefore a primary object of the present invention to provide a simplified method for manufacturing such fluid processing systems.

It is another object of the present invention to provide a method for manufacturing such fluid processing systems by which the necessity for carrying an inventory of rollers of different geometry can be eliminated.

It is another object of the present invention to provide a method for facilitating the assembly of such processing systems through the use of an adjustable electric discharge machining technique.

Other objects of the invention will, in part, be obvious and will, in part, appear hereinafter. The invention accordingly comprises the method possessing the sequence of steps which are exemplified in the following detailed disclosure.

SUMMARY OF THE INVENTION

This invention, in general, relates to photographic processing systems and, in particular, to a method for assembling photographic processing systems from system piecepart lots comprised of individual parts which vary within prescribed tolerances. The processing systems are of the type for advancing integral, self-processable type film units to the exterior of a camera while simultaneously spreading a fluid processing composition in a uniformly thin layer between selected layers of a film unit. The processing systems include a pair of processing rollers having surfaces which are partially textured by an electric discharge machining process and are resiliently supported in the system by other system pieceparts to define a pressure-generating gap therebetween through which the film unit is advanced by rotating at least one of the rollers after or just prior to a film unit being brought into engagement therewith.

The method of the invention comprises the steps of partially texturing a number of untextured processing rollers of predetermined geometry with an electric discharge machining process of predetermined conditions to provide the rollers with a predetermined partially-textured surface.

Following this, a predetermined number of pieceparts from each lot of system pieceparts, except for rollers, are randomly selected and a number of test processing systems are assembled therefrom using the rollers having the predetermined partially-textured surface.

A number of characteristic film units are then processed through each test processing system and the fluid layer thickness provided by each test processing system is measured.

The difference between the fluid layer thickness performance of the test processing systems and a predetermined standard, which includes a prescribed tolerance on the allowable variation in fluid layer thickness, is then statistically determined and it is decided if processing systems manufactured with the pieceparts and rollers having the predetermined partially-textured surface will provide acceptable product. If so, the remaining pieceparts of each lot are used in combination with rollers having the predetermined texturing to manufacture additional systems. If the test system performance is not acceptable, the electric discharge machining process conditions are adjusted by a predetermined amount which is sufficient to effect minor changes in fluid thickness control that can result in acceptable performance. Rollers are then textured with the adjusted electric discharge machining process and systems are then assembled using the piecepart lots in combination with rollers having surfaces textured according to the adjusted electric discharge machining process.

DESCRIPTION OF THE DRAWINGS

The novel features that are considered characteristic of the invention are set forth with particularity in the appended claims. The preferred mode of practicing the invention, however, will best be understood from the following description of the illustrated method when read in connection with the accompanying drawings wherein like numbers have been employed in the different figures to denote the same parts and wherein:

DESCRIPTION OF THE PREFERRED METHOD

This invention relates to a method for assembling photographic processing systems of the type for advancing integral, self-processable type film units to the exterior of a camera while simultaneously spreading a fluid processing composition in a uniformly thin layer between selected layers of a film unit. To fully understand the nature and advantages of the method of the invention, a description of a preferred photographic processing system, which is assembled according to the teachings of the invention, first will be provided in connection with a camera and a film unit which are of the type particularly suitable for use with the processing system to be described.

Figure 1:
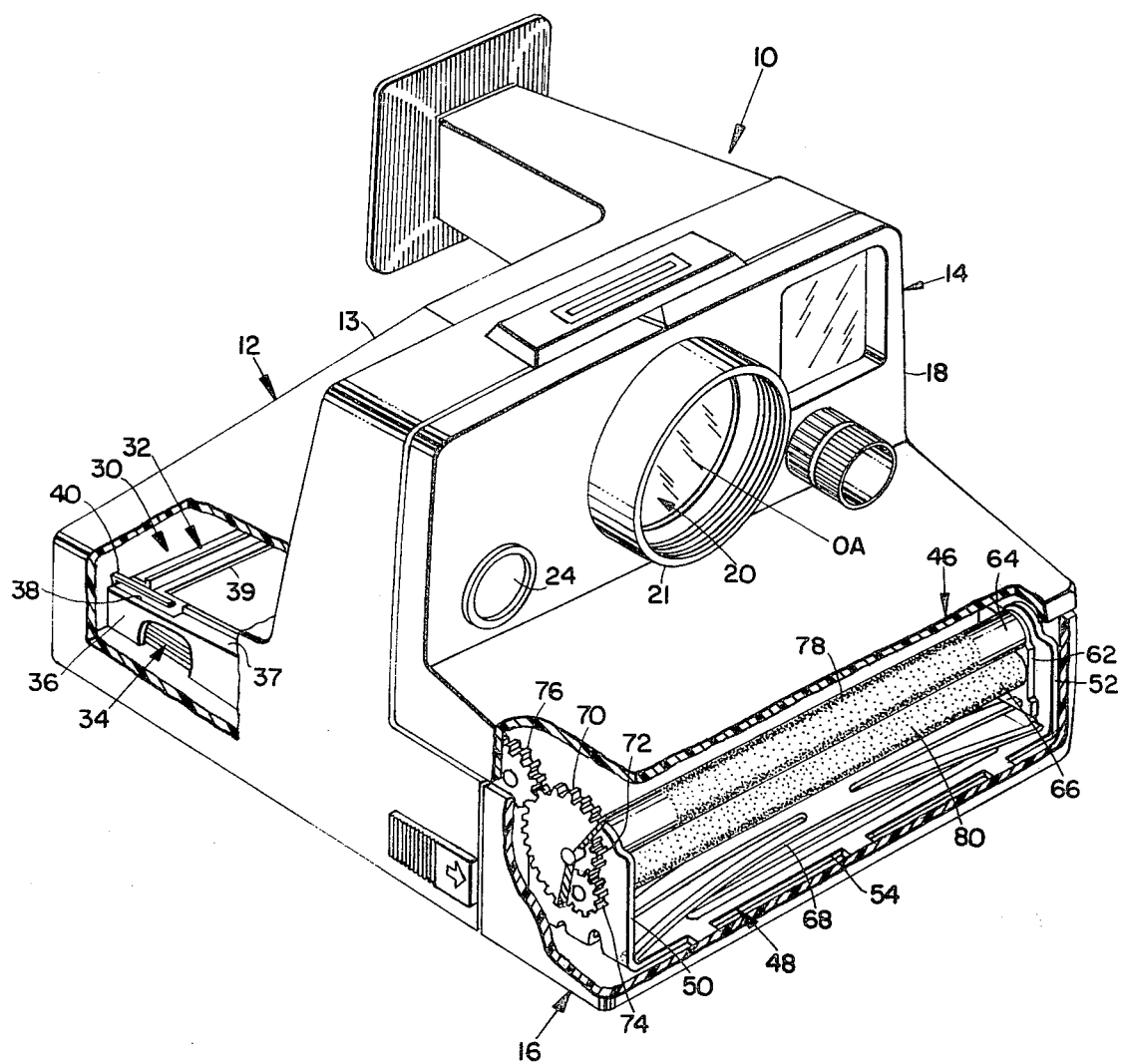
FIG. 1 is a perspective view, with parts broken away, of a self-processable type camera embodying a fluid processing system manufactured according to the method of the present invention.

Referring now to FIG. 1, there is shown a highly automatic camera 10 of the type which uses integral, self-processable film units and in which a photographic processing system (46) assembled according to the method of the present invention is incorporated.

The camera 10 comprises a body 12, a front cover 14, and a door 16 which interconnect to define its outward appearance and serve as a protective enclosure for housing the camera interior components.

Located in a vertical forward wall 18, which forms part of the front cover 14, is an objective taking lens 20 having an optical axis, OA, therethrough. The objective taking lens 20 may be a Cooke Triplet or similar multi-element type of lens which can have its focal length changed by adjusting the axial air spacing between its optical elements. This may be accomplished in a well-known manner by rotating a bezel, such as that designated at 21, which extends through an opening in the front cover vertical wall 18 and is coupled with a screw-threaded lens mount (not shown).

Formed in the base of the body 12 is a well-known film cassette receiving chamber 30 which is adapted to releasably hold a film cassette such as that designated at 32. The cassette 32 comprises a generally rectangular parallelepiped housing 36 which has an upwardly facing wall 37 having a generally rectangular aperture 39 therein. Mounted in registration with and biased toward the aperture 39 is a stacked array of integral-type, self-processable film units generally designated at 34. Underneath the stacked array of film units 34 is a flat, thin battery (not shown) which may be used to supply power to the various electrical components of the camera 10.

Figure 2:
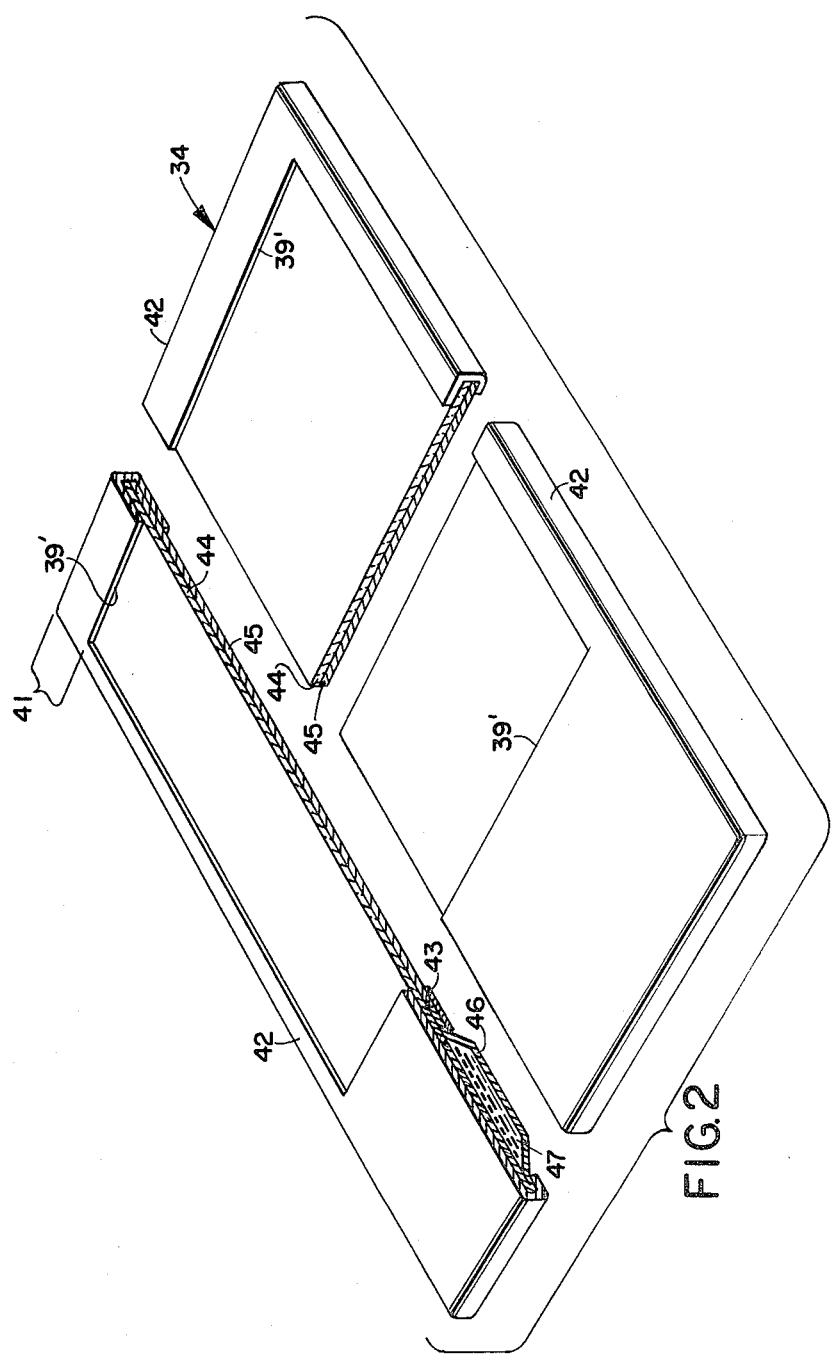
FIG. 2 is a cutaway perspective view of a self-processable type film unit that is used in the camera of FIG. 1.

Each film unit 34, as best seen in FIG. 2, comprises a pair of superposed sheet elements including a top transparent sheet 44, preferably formed of Mylar, beneath which is a bottom sheet that is designated at 45. Positioned adjacent a leading edge 43 of the bottom sheet 45 is a rupturable container 46, sometimes referred to as a pod, in which there is disposed a quantity of viscous photographic processing fluid or composition 47. The rupturable container 46 is positioned and adapted in a well-known manner to release its fluid contents between the sheet elements 44 and 45 and thereafter the fluid mass is spread uniformly between the sheet elements (44 and 45), all in response to an external pressure progressively applied on the film unit. This is done, as is well-known, to effect a diffusion transfer process after photoexposure.

Each of the sheet elements, 44 and 45, of the film unit 34 and the rupturable container 46 are bound together by a binding element 42 which overlaps their lateral edges and has portions adhered to their outwardly facing surfaces. The peripheral edges of the binding element 42 which terminate on the outer surfaces of the transparent sheet element 44 are generally coextensive with the aperture 39 of the film cassette 32 and, as such, define the area of each film unit 34 which may be exposed through the top transparent sheet element 44. The edges of the exposure area are designated as 39′. Also, the longitudinal edges of each film unit sheet element (44 and 45) which are bound by the element 42 operate in a well-known manner to, at least in part, define the thickness of the layer of processing fluid which can be spread between the sheet elements of the film unit 34.

An example of such a film cassette is described in considerable detail in U.S. Pat. No. 3,872,487 issued to Nicholas Gold on Mar. 18, 1975 and entitled "Photographic Film Assemblage and Apparatus" and of such film units in previously mentioned U.S. Pat. Nos. 3,415,644; 3,594,165; and 3,761,268.

Referring back now to FIG. 1, it can be seen that the camera body 12 also includes a generally planar rear wall 13 slanted at a predetermined angle with respect to both the film cassette 32 and the optical axis, OA, of the objective taking lens 20. Attached to the interior of the rear wall 13, but not shown, is a trapezoidal-shaped mirror positioned along the optical axis, OA, intersecting it at a predetermined angle, to provide a folded optical path between the objective taking lens 20 and a forwardmost one of the stacked array of film units 34. With this optical arrangement, light rays from a scene which emerge from the objective taking lens 20 are reflected from the mirror toward the film units 34.

Exposure of the film units 34 is regulated automatically by a well-known exposure control system which is located, but not shown, behind the front cover vertical forward wall 18.

To the left of the objective taking lens 20 is a camera start button 24 which, when actuated, initiates a camera operating cycle in a well-known manner.

Once the camera operating cycle is initiated, photoexposure of a forwardmost one of the film units 34 is effected in the manner previously outlined. The photoexposed film unit is then advanced toward the forward end of the camera 10 where it is brought into engagement with the film processing system 46 which is assembled in the manner of the method of the invention to be descrbed hereinafter.

Advancement of a photoexposed film unit 34 is accomplished via a pick member 40 which fits into a slot 38 of the film cassette housing 36 and engages a portion of the trailing edge of a forwardmost film unit 34. The pick member 40 is actuated by a well-known film advancing apparatus to which it is attached to move toward the processing apparatus 46 a predetermined distance while pulling a photoexposed film unit 34 along with it.

Such a film advancing arrangement is described in considerable detail in, for example, U.S. Pat. No. 3,047,192 issued to Bruce K. Johnson et al. on Sept. 6, 1977 and entitled "Photographic Apparatus With Sequencing System".

The film processing apparatus 46 is mounted in a well-known manner on the door 16 to pivot downwardly therefrom to provide access to the film cassette receiving chamber 30 so that the film cassette 32 can be loaded into or removed from the film cassette receiving chamber 30. As an example of this arrangement, reference may be had to U.S. Pat. No. 3,974,510 issued to Andrew S. Ivester on Aug. 10, 1976 and entitled "Mounting Apparatus For A Spreader Roller Assembly".

Figure 3:
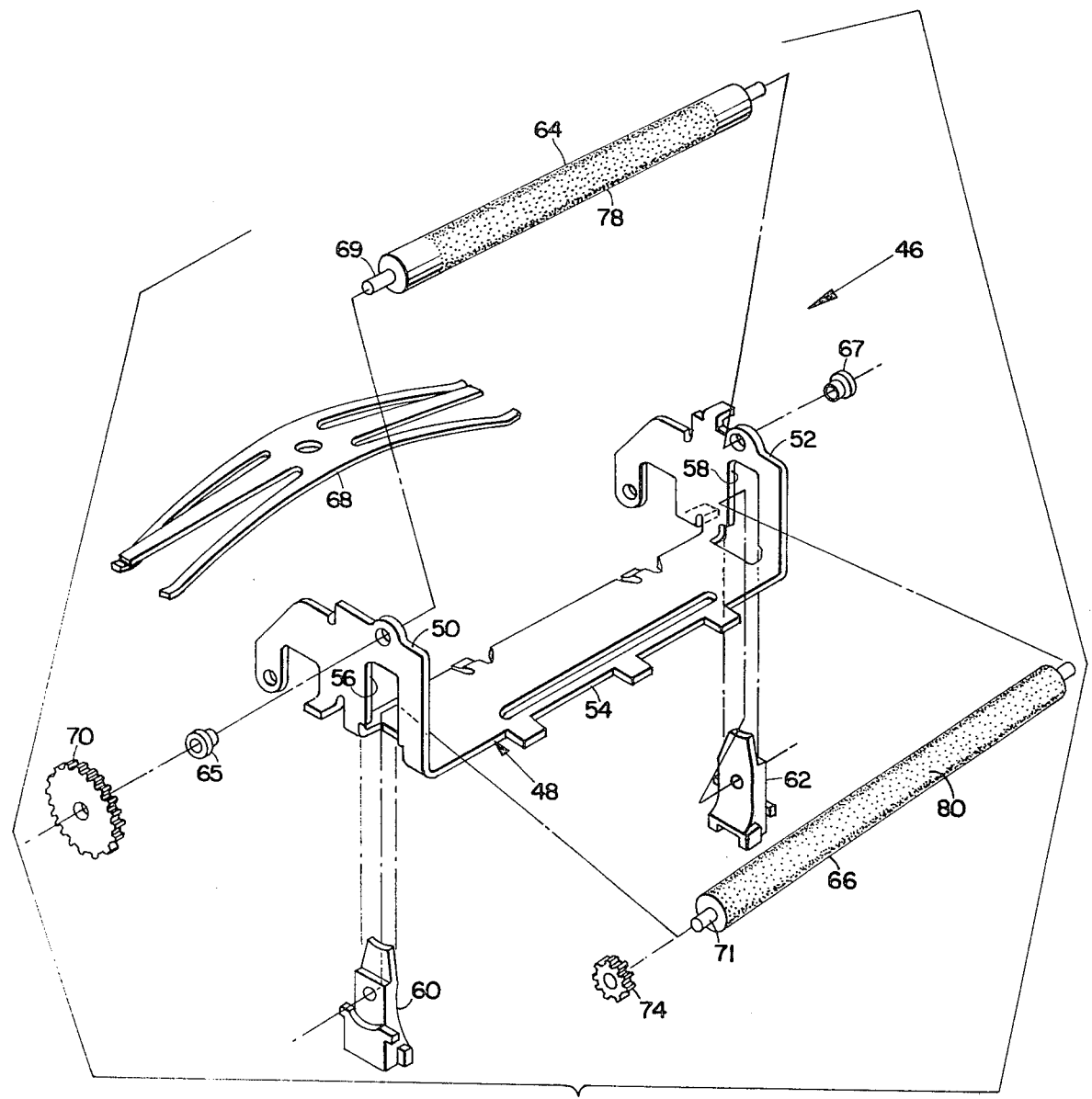
FIG. 3 is an exploded perspective view of the film processing apparatus of the camera of FIG. 1.

As best seen in FIG. 3, the processing system 46 comprises a "U"-shaped support bracket 48 which includes a base 54 that is structured to attach to the door 16. The base 54 has two spaced-apart vertical legs, 50 and 52, depending upwardly therefrom. Formed in each vertical leg, 50 and 52, are vertically-oriented slots, 56 and 58 respectively. Slidably disposed in each vertical slot, 56 and 58, are complementary configured bearing blocks, 60 and 62 respectively, in which are mounted for rotation the journals of a cylindrical bottom roller 66. The bottom roller 66 thus arranged can rotate with respect to the bearing blocks, 60 and 62, while the bearing blocks, 60 and 62, can slide up or down in their respective slots, 56 and 58.

Opposed end portions of a bow-shaped spring 68 engage, respectively, the bottoms of the bearing blocks, 60 and 62, to resiliently urge the roller 66 upwardly.

Rotatably mounted above the bottom roller 66 is a top roller 64 whose journals fit complementary shaped bearings, 65 and 67, which are pressed into the upper end portions of the vertical legs, 50 and 52 respectively. In this manner, the rollers 64 and 66 are rotatably mounted in juxtaposed relationship to define a pressure-generating gap between them through which a film unit 34 can be advanced by rotation of the rollers, 64 and 66, in a manner to be described.

Figure 9:
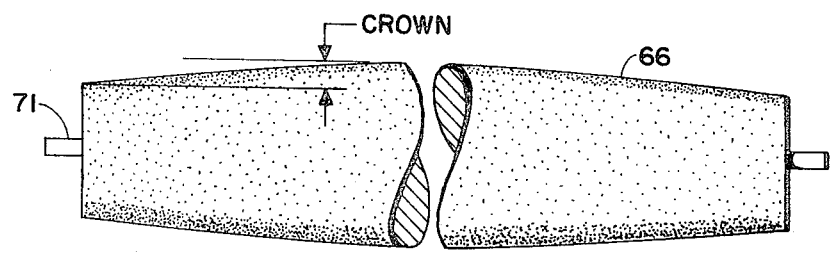
FIG. 9 in an enlarged diagrammatic planar view of a processing roller which is utilized in the processing apparatus shown in FIGS. 1 and 3.

The bottom roller 66, as best seen in FIG. 9, is provided for well-known reasons with a predetermined crown to accommodate a bending motion the roller 66 undergoes while a film unit 34 is being processed.

Fixedly mounted on a journal 69 of the top roller 64 is a compound spur gear comprising a gear 70 meshed with a pinion gear 76 and a gear 72 meshed with a gear 74 which is fixedly attached to a journal 71 of the bottom roller 66 (see FIG. 1).

The pinion gear 76 is driven by a well-known motor powered gear train (not shown) causing the rollers 64 and 66 to rotate, via the gearing arrangement outlined, to advance a photoexposed film unit 34 to the exterior of the camera 10 while spreading the self-contained processing fluid 47 in a substantially uniform thin layer between the sheet elements, 44 and 45.

Such a gearing arrangement is described in detail, for example, in U.S. Pat. No. 4,051,492 issued to Irving Laskin et al. on Sept. 27, 1977 and entitled "Photographic Apparatus Gear Train Having A Unique Set Of Gears".

The cylindrical processing rollers, 64 and 66, are preferably formed of stainless steel and have their circumferential surfaces first machined to a precision diameter (tolerances held to a few tenths of a mil) to facilitate spreading of the film unit processing fluid 47. Thereafter, the circumferential surfaces of each roller, 64 and 66, are provided with roughened surfaces, 78 and 80 respectively, to provide a high-friction characteristic for transporting the film units 34 without leaving any visually perceptible marks on them, particularly their transparent Mylar top sheet 44.

The roughened surfaces, 78 and 80, are of the type that are more fully desribed in U.S. Pat. No. 4,147,425 issued to Harvey S. Friedman et al. on Apr. 3, 1979 and entitled "Photographic Processing Roller Having A Surface Roughened By Electric Discharge Machining" and comprise a plurality of generally spaced-apart, substantially uniform sized and shaped microscopic craters formed in each roller circumferential surface by electrical discharge machining (EDM) in a manner to be described.

The manner in which the microscopic craters are formed in each surface of the rollers, 64 and 66, and the distribution and size of the craters over the circumferential surfaces of the rollers, 64 and 66, is such that the rollers, 64 and 66, are provided with a high-friction, low-abrasion characteristic without destroying the effectiveness of the precision diameters of the rollers, 64 and 66, so that substantially no change in fluid spreading performance results from the presence of the EDM craters. However, according to the method of the present invention, as will hereinafter be explained, the process by which the EDM craters are formed in the circumferential surfaces of the rollers, 64 and 66, can be altered in a controllable way to effect minor changes in the thickness of the fluid layer spread by the rollers, 64 and 66, and it has been discovered that the exercise of such fine adjustments over the effect which the EDM textured surfaces of the rollers, 64 and 66, have on fluid layer thickness control is extremely beneficial in the assembly of photographic processing systems of this type.

Figure 4:
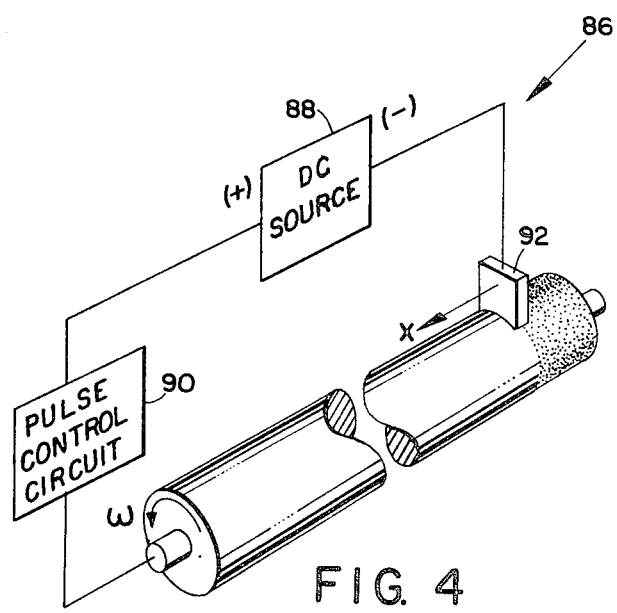
FIG. 4 is a diagrammatic perspective view of apparatus by which a roller surface can be textured by using an electric machining process.

Accordingly, the method of the invention comprises partially texturing the surfaces of a number of processing rollers, such as 64 and 66, with an electric discharge machining process having predetermined conditions which represent a preferred nominal texturing. An electrical discharge machining apparatus 86 by which the circumferential surfaces of the rollers can be partially textured is shown diagrammatically in FIG. 4 to which reference is now made.

The rollers are mounted for rotation at a controlled angular speed, $\omega$. One end of a roller is coupled to the positive end of a DC source 88 via a conventional EDM pulse control circuit 90 while the negative end of the DC source is coupled to an electrode 92. The electrode 92 is mounted for controllable movement along the length of the roller and toward its surface to establish a gap between the electrode 92 and the roller surface. This may be accomplished in a well-known manner, as, for example, by using a servomechanism designed for this purpose. The electrode 92 as shown is shaped to closely conform to the roller surface and covers only a fraction of the roller circumference being substantially narrow compared to the roller diameter and length. As is well-known, the roller and electrode 92 are immersed in a suitable dielectric fluid to facilitate the EDM process.

With the apparatus 86, the roller is rotated at a fixed angular speed while the electrode 92 is moved along its length at a fixed linear velocity in a direction, X, traversing the roller length from end to end just once.

During the electrode traverse, craters are randomly formed on the roller surface in a generally spaced apart relationship. The actual size, depth and distribution of the craters depends, of course, on such parameters as electrode-to-surface gap, power transfer during arc discharge, duration of arc discharge, polarity of the electrode and roller, and the relative movement of the electrode 92 with respect to the roller surface.

For a photographic processing system utilizing stainless steel rollers of approximately one-quarter of an inch in diameter and having an uncratered surface finish generally less than 16 microinches per inch (AA) and suitable for use with "SX-70" type film manufactured by Polaroid Corporation, the preferable nominal EDM process conditions are to rotate the roller at 600 rpm while moving a one-sixteenth inch wide electrode across the roller length at a rate of 0.7 inches per second. Current is preferably set 2.7 amps and the arc pulse on-time is preferably seven microseconds in duration while its off-time is preferably 25 microseconds.

Having textured a number of virgin processing rollers with the nominal EDM process conditions outlined hereinabove, pieceparts are then randomly selected from lots of all other pieceparts which comprise a photographic processing system. Such pieceparts would be those that appear in FIG. 3 and which have been described hereinabove. A number of test processing systems are then assembled with the rollers having the nominal EDM texturing and the randomly selected pieceparts from each of the piecepart lots. In this manner, the test systems thus built will have fluid thickness control performance which is representative of an entire batch of processing systems which can be made from the combination of the nominal EDM textured rollers selected for test purposes and the various piecepart lots.

Characteristic film units are then processed through each of the test systems, and the fluid layer thickness in each film unit thus processed is afterwards measured and compared with a predetermined standard. For this purpose the processing test systems are preferably placed in a fixture that represents a nominal camera and the film units used for test purposes represent film units having nominal physical characteristics.

The predetermined standard, which is independently established, sets the nominal fluid layer thickness required for optimum photographic performance and the allowable variation (tolerance) in that thickness. For film units of the type with which the processing system is to be used, the thickness standard typically is 0.00345 inches±.000225 inches (±6.5%). However, the standard may vary from time to time depending on the particular chemical and physical structure of the film unit or any changes therein.

Figure 5:
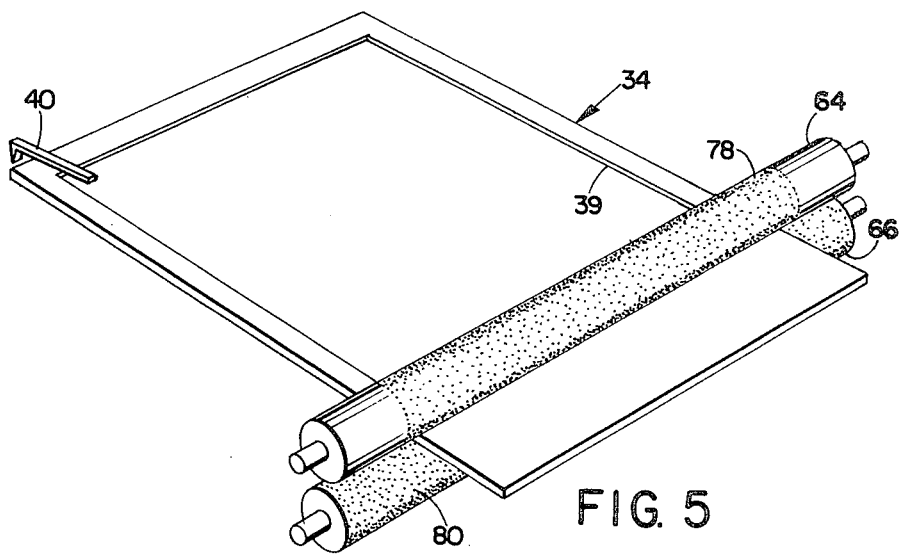
FIG. 5 is a diagrammatic perspective view of a part of the film processing apparatus of FIG. 1 shown in combination with a film unit of the type shown in FIG. 2.

Determination of the difference between the fluid layer thickness performance of the test systems and the predetermined standard on fluid layer thickness is done using well-known statistical methods and a weighing technique. The manner in which fluid layer thickness is preferably measured by the weighing technique may best be understood by now referring to FIGS. 2 and 5. After photoexposure, a film unit 34 has its leading end brought between the rollers 64 and 66 which are made to rotate in the manner previously described. Once the film unit leading edge has been brought between the rotating rollers 64 and 66, the rollers progressively advance the film unit and simultaneously apply a pressure to its external surfaces. This pressure first operates to rupture the pod 46 causing its fluid contents 47 to be expelled between the sheet elements 44 and 45. The film unit 34 continues to be advanced by the rotating rollers 64 and 66, and as the film unit is advanced through the rollers 64 and 66, the mass of fluid processing composition 47 is uniformly spread in a thin layer between the sheet elements 44 and 45 and over the photoexposed area (39') of the film unit 34. The fluid 47 flows in a direction opposite to the direction of travel of the film unit 34 through the rollers 64 and 66. After the film unit 34 passes through the rollers (64 and 66), a certain amount of the fluid contents of the pod 46 will have been distributed over the photosensitive area (39') of the film unit 34 and there will be remaining a portion which is trapped in a part of the film unit 34 particularly designed for this purpose. The trap portion of the film unit 34 is designated at 41 in FIG. 2. The portion remaining in the trap area 41 can be weighed and its weight gives a measure of the thickness of the layer of fluid distributed over the photoexposed area of the film unit 34.

This is easily understood when it is realized that there must be a certain initial weight of fluid processing composition 47 in the pod 46 to cover the particular photoexposed area of the film unit 34 with the nominal fluid layer thickness required by the standard. By knowing in advance what the required fluid layer thickness is, the area to be covered by that thickness, and the density of the fluid processing composition, it is possible to calculate what the initial weight of the fluid processing composition needs to be in order to cover the desired area and have a nominal residual left over. Thus, for example, for a photoexposure area of 9.86 square inches, a fluid density of 1.6 to 1.7 grams per cc, a fluid thickness requirement as previously outlined, and an initial weight of fluid in the pod of 1100 milligrams, the trap weight is nominally 180 milligrams and the amount of fluid distributed over the photoexposed area is 920 milligrams. Based on the tolerances for the fluid layer thickness, the trap weight for a thickness on the low end of the specification is 240 milligrams while the weight distributed over the photoexposed area of the film unit is 860 milligrams. For the upper end of the tolerance on the thickness of the fluid, the corresponding trap weight is 120 milligrams while the weight of the fluid distributed over the photoexposed area is 980 milligrams. These calculations, of course, assume that the fluid is uniformly distributed over the photo-exposed area of the film unit 34.

Figure 6:
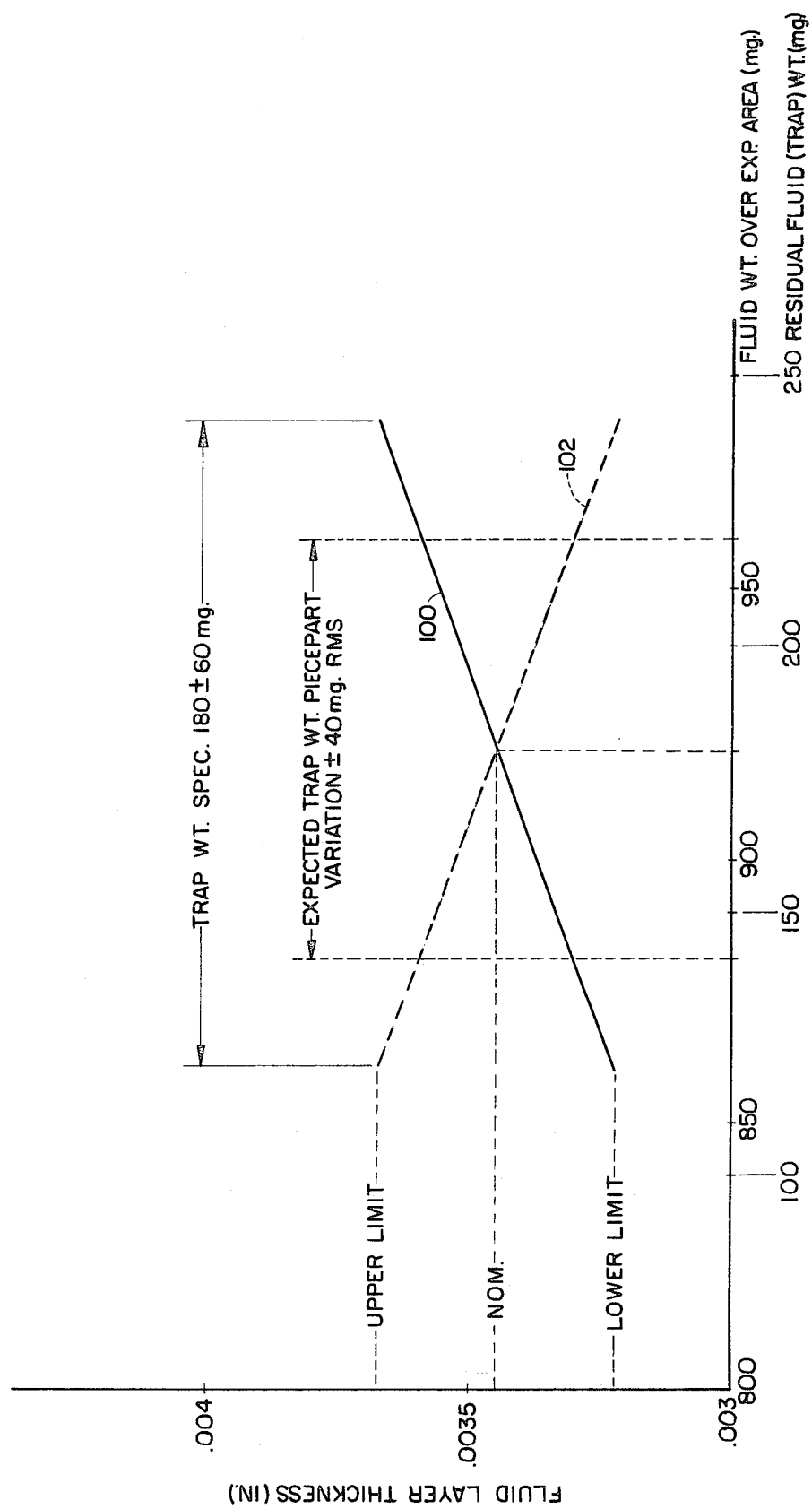
FIG. 6 is a graph showing the variation in fluid layer thickness over the photoexposed area of a film unit as a function of either the weight of processing fluid spread over the photoexposed area of the film unit of FIG. 2 or of the weight of residual processing fluid remaining after the photoexposed area of the film unit has been fully covered.

These data are plotted in FIG. 6 wherein the curve 100 represents the variation in fluid layer thickness over the photoexposed area of the film unit 34 as a function of the weight of the fluid distributed over the photoexposed area of the film unit, and the curve 102 represents the variation in thickness in fluid over the photoexposed area of the film unit 34 as a function of the weight of the fluid remaining in the trap area 41 of the film unit 34 after the film unit 34 has been processed.

If the combination of test system parts provides acceptable fluid layer thickness control performance when compared to the standard, the remaining pieceparts of each piecepart lot are used in combination with rollers having the predetermined nominal texturing to manufacture additional systems. This particular combination, as will be appreciated by those skilled in the art, should provide acceptable fluid layer thickness control performance because the remainder of the pieceparts will have been randomly selected and therefore assembled in the same manner in which the test systems were assembled.

If the performance of the test systems is not acceptable, the electric discharge machining process conditions are adjusted in a manner to be described by a predetermined amount which is sufficient to effect minor changes in fluid thickness control that can result in acceptable performance.

Unacceptable fluid layer thickness performance can result because of the tolerance stackup of the individual piecepart dimensions which contribute to those parameters which are significant for determining fluid layer thickness control. And, as is well-known, this can happen even when all of the piecepart dimensions are within the acceptable tolerance limits imposed on the pieceparts. Thus, an unacceptable fluid layer thickness performance for the test system indicates that further systems assembled from the sampled pieceparts which have rollers textured with the nominal surface will result in unacceptable fluid layer thickness performance for this particular combination. Therefore, the fluid layer thickness performance of systems made from these particular piecepart lots must be altered to bring the performance into acceptable limits.

This can be done in the manner of this invention by adjusting the electric discharge machining process conditions in a predetermined way so as to cause minor changes in the trap weight (thickness) which are sufficient to change the fluid layer thickness control performance of processing systems by amounts which are sufficient to overcome any expected variations in fluid layer thickness control performance which can be attributed to known piecepart dimensional effects. For example, the variation in trap weight that can occur as a result of variations in the tolerances of the dimensions of the pieceparts has been estimated to be ±40 milligrams on a root mean square basis (see FIG. 6).

Figure 7:
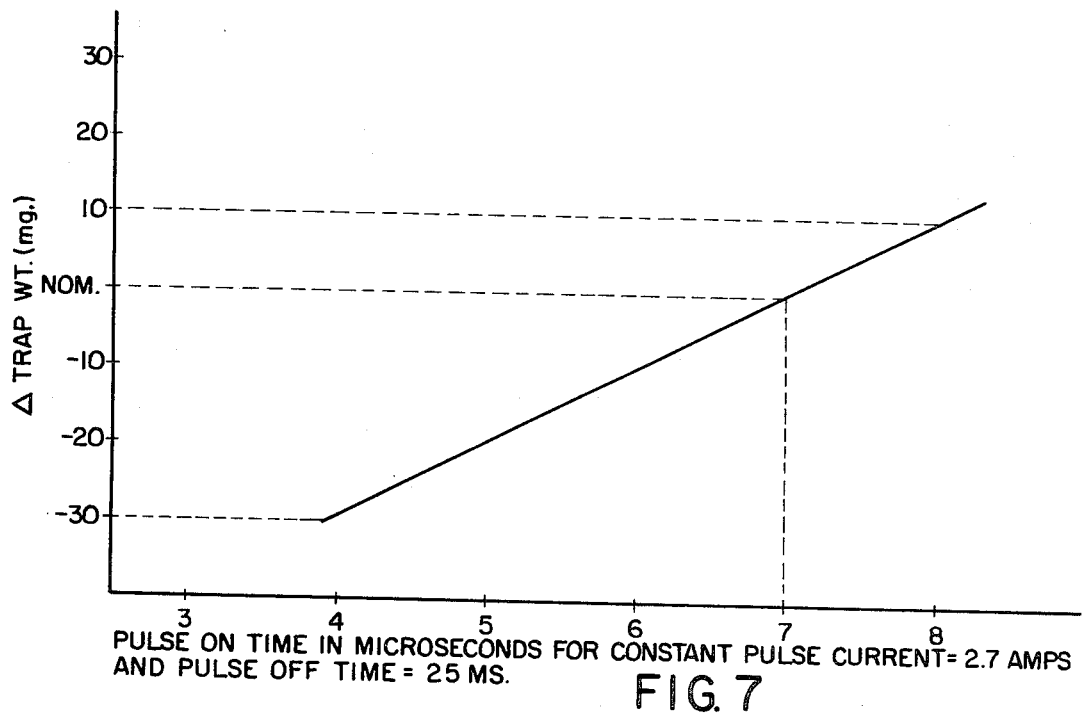
FIG. 7 is a graph showing a variation in residual processing fluid weight as a function of arc pulse on-time in an electric discharge machining process.
Figure 8:
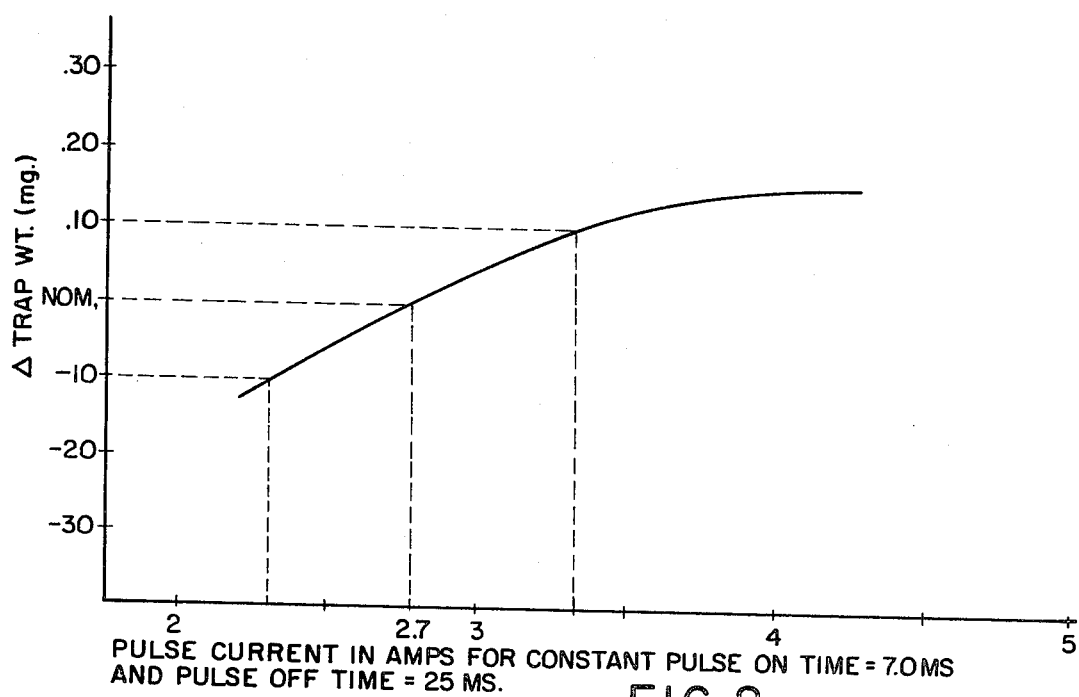
FIG. 8 is a graph showing a variation in the residual processing fluid weight of a film unit as a function of arc current in an electric discharge machining process.

The predetermined amounts by which the EDM process conditions can be changed without resulting in any substantial change in the fluid spreading performance of the untextured rollers and the effect on trap weight (thickness) of changing the electric discharge machining process conditions by those amounts is illustrated in FIGS. 7 and 8. FIG. 7 indicates that changes in the pulse on-time with a constant current and constant pulse off-time, can bring about changes in the trap weight of +10 milligrams or −20 milligrams from the nominal trap weight, a range of 30 milligrams. FIG. 8 indicates the change in trap weight which can be accomplished by changing the pulse current, which is in amperes, for constant pulse on-time and constant pulse off-time. Here the changes are somewhat less than those which can be achieved by varying pulse on-time, but some effect is still present as can be seen from FIG. 7 wherein it is indicated that the trap weight can be changed ±10 milligrams with respect to the nominal trap weight for changes in pulse current which range from approximately 2.3 to 3.4 amps.

The corresponding changes in fluid layer thickness which result from such trap weight changes can be best seen in FIG. 6 wherein the fluid layer thickness changes by approximately 0.4 ten-thousandths of an inch for every 10 milligram change in trap weight. Thus, if it is determined that the performance of the test systems with the rollers conforming to the nominal electric discharge machining process conditions is unacceptable, the direction in which the fluid layer thickness control performance differs from the nominal performance as specified in FIG. 6 is determined and an inspection of the graphs in FIGS. 7 and 8 is then made to determine in which direction the electric discharge machining process conditions must be adjusted to effect a favorable change in fluid layer thickness control performance for the particular combination of pieceparts represented by the test systems.

Untextured rollers are then textured with the adjusted electric discharge machining process conditions and systems are then assembled using the piecepart lots in combination with rollers having surfaces textured according to the adjusted electric discharge machining process. These systems for the statistical reasons previously referred to should now result in acceptable fluid layer thickness control performance for all of the processing systems assembled with the various lots of pieceparts and the adjusted electric discharge machining process.

The method of this invention simplifies the assembling of processing systems of this type when compared to known practices which were previously used to manufacture such systems. Prior practices required the geometry of pieceparts to be individually characterized and systems were then assembled on the basis of selected piecepart matches to provide optimum performance. A number of spread rollers having different crowns as shown in FIG. 9 were carried in inventory, and the differently crowned rollers were used to accommodate variations in other pieceparts. This assembly practice of piecepart matching and then compensating for variations in fluid layer thickness control performance by utilizing a series of differently crowned rollers required carrying in inventory a relatively expensive, long leadtime item. The necessity of carrying differently-crowned rollers is now eliminated by utiizing a single crowned roller which can have its EDM surface controllably changed in a minor way to accommodate variations in fluid layer thickness control performance which are directly attributable to variations in the geometry of other individual pieceparts.

It will be appreciated that the changes in fluid layer thickness control which are achievable with the method of the present invention are small, representing fluid thickness changes of approximately only one-third of the fluid thickness tolerance. Consequently, such EDM process changes do not substantially effect the fluid spreading performance of the untextured rollers and could not be utilized to compensate for poor performance caused by piece-parts or combinations of pieceparts, including untextured rollers, which were substantially out of tolerance.

In the foregoing manner it has been demonstrated that very minor changes in fluid layer thickness control performance can be effected through the use of minor changes in the process conditions by which spread rollers of the foregoing type are provided with a partially textured EDM surface for purposes of high friction and that these minor changes, which represent approximately one-third of the thickness tolerance, can be beneficially used to simplify the process by which photograhic processing systems utilizing such rollers are assembled.

Those skilled in the art may make still other changes according to the teachings of the disclosure. For example, instead of the EDM process used to form the microscopic craters in a roller surface for purposes of providing the high-friction characteristic, such microscopic craters can be formed and varied by transferring to a roller surface a plurality of low-energy laser pulses in the manner described in U.S. Pat. No. 4,200,382 issued to Harvey S. Friedman on Apr. 29, 1980 and entitled "Photographic Processing Roller And A Method Which Utilizes A Pulsed Laser For Manufacturing The Roller". Therefore, it is intended that all subject matter contained in the above description or shown in the accompanying drawings shall be interpreted as illustrative and not in a limiting sense.

What is claimed is:

1. A method for assembling photograhic processing systems from system piecepart lots the individual parts of which vary within prescribed tolerances wherein the processing systems are of the type for advancing integral self-processable film units to the exterior of a camera while simultaneously spreading a fluid processing composition in a uniformly thin layer between selected layers of the film unit and wherein the processing systems include a pair of processing rollers having surfaces which are partially textured by an electric discharge machining process and are resiliently supported in the system by other pieceparts to define a pressure generating gap therebetween through which the film unit is advanced by rotating at least one of the rollers after or just prior to the film unit being brought into engagement therewith, said method comprising the steps of:

partially texturing a number of untextured processing roller blanks of predetermined geometry by transferring to the surface of a roller with a predetermined process a plurality of energy pulses each of which contains sufficient energy to locally melt said surface to form therein a plurality of generally spaced apart microscopic craters to provide said rollers with a predetermined partially textured surface;

randomly selecting a predetermined number of pieceparts from each lot of system pieceparts, except for rollers, and assembling a number of test processing systems therefrom using said rollers having said predetermined partially textured surface;

processing a predetermined number of characteristic film units through each test system and measuring the fluid layer thickness provided by each;

statistically determining the difference between the fluid layer thickness performance of said test systems and a predetermined standard which includes a prescribed tolerance on the allowable variation in fluid layer thickness and deciding if processing systems manufactured with said pieceparts and said rollers having said predetermined partially textured surface will provide acceptable product, and if so, assembling processing systems with said pieceparts and rollers having said predetermined partially textured surface, and, if not;

adjusting said predetermined process conditions used to texture the rollers used in said test systems by a predetermined amount which is sufficient to alter roller surface texturing enough to effect a minor change in the fluid thickness that can result in an acceptable product when rollers having said adjusted texture are used with said piecepart lots; and texturing a number of rollers with said adjusted process having said adjusted process conditions and assemblying processing systems with said piecepart lots and said rollers having said adjusted textured surfaces.

2. A method for assembling photographic processing systems from system piecepart lots the individual parts of which vary within prescribed tolerances wherein the processing systems are of the type for advancing integral self-processable film units to the exterior of a camera while simultaneously spreading a fluid processing composition in a uniformly thin layer between selected layers of the film unit and wherein the processing systems include a pair of processing rollers having surfaces which are partially textured by an electric discharge machining process and are resiliently supported in the system by other pieceparts to define a pressure generating gap therebetween through which the film unit is advanced by rotating at least one of the rollers after or just prior to the film unit being brought into engagement therewith, said method comprising the steps of:

partially texturing a number of untextured processing roller blanks of predetermined geometry with an electric discharge machining process of predetermined conditions to provide said rollers with a predetermined partially textured surface;

randomly selecting a predetermined number of pieceparts from each lot of system pieceparts, except for rollers, and assembling a number of test processing systems therefrom using said rollers having said predetermined partially textured surface;

processing a predetermined number of characteristic film units through each test system and measuring the fluid layer thickness provided by each;

statistically determining the difference between the fluid layer thickness performance of said test systems and a predetermined standard which includes a prescribed tolerance on the allowable variation in fluid layer thickness and deciding if processing systems manufactured with said pieceparts and said rollers having said predetermined partially textured surface will provide acceptable product, and if so, assembling processing systems with said pieceparts and rollers having said predetermined partially textured surface, and, if not;

adjusting said electric discharge machining process conditions used to texture the rollers used in said test systems by a predetermined amount which is sufficient to alter roller surface texturing enough to effect a minor change in the fluid thickness that can result in an acceptable product when rollers having said adjusted texture are used with said piecepart lots; and texturing a number of rollers with said electric discharge machining process having said adjusted process conditions and assemblying processing systems with said piecepart lots and said rollers having said adjusted electric discharge machined surfaces.

3. The method of claim 2 wherein said predetermined fluid layer thickness standard comprises a nominal thickness value and said allowable variation in said fluid layer thickness is plus or minus 6.5% of said nominal value.

4. The method of claim 3 wherein said adjustment of said electric discharge machining process conditions are effective to cause changes in said fluid layer thickness layer of approximately one-third of the thickness represented by the range of said fluid layer thickness tolerance.

5. The method of claims 3 or 4 wherein said nominal value of said fluid layer thickness standard is 0.00345 inches.

6. The method of claim 2 wherein said electric discharge machining process comprises the steps of mounting a roller for rotation at a constant angular speed about its longitudinal axis while traversing the surface of a roller at a constant linear velocity parallel to the roller axis of revolution with an electrically polarizable electrode of predetermined geometry while the roller and the electrode are emersed in a dielectric fluid and controlling the electrical power supplied to said electrode in a predetermined manner to randomly form microscopic craters in the roller surface as the power available to said electrode discharges in arcs from said electrode to the roller surface via said dielectric fluid.

7. The method of claim 6 wherein said adjustments in said electric discharge machining process conditions comprise the steps of changing the electrical power supplied to said electrode to change either the magnitude of the current of said arcs, the duration of said arcs, or the time between said arcs or any combination of these.

8. The method of claim 7 wherein increasing the current of said arcs with the other of said process conditions being held constant decreases the thickness of the fluid layer.

9. The method of claim 7 wherein increasing the duration of said arc discharge with the other of said process conditions being held constant decreases the thickness of the fluid layer thickness.

10. The method of claim 7 wherein said predetermined electric discharge machining process conditions are selected so that arc current is 2.7 amperes, one-time of said arcs is 7.0 microseconds, and off-time of said arcs is 25 microseconds.

11. The method of claim 7 wherein said adjustments to said electric discharge machining process conditions comprise changing the magnitude of said arc current over a range of 2.3 to 3.5 amperes.

12. The method of claim 7 wherein said adjustments to said electric discharge machining process conditions comprise changing the duration of said discharge arcs over a range of 4 to 8 microseconds.

* * * * *